US009552375B2

(12) United States Patent
Smietanka et al.

(10) Patent No.: US 9,552,375 B2
(45) Date of Patent: Jan. 24, 2017

(54) GEOCODING OF IMAGES BASED ON SEARCH QUERIES (71) Applicant: Google Inc., Mountain View, CA (US)

(72) Inventors: Wojciech Stanislaw Smietanka, Canton of Schwyz (CH); Daniel Cotting, Aargau (CH); Boris Bluntschli, Canton of Zurich (CH); Nicolas Dumazet, Zurich (CH)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 14/136,689

(22) Filed: Dec. 20, 2013

(65) Prior Publication Data

US 2015/0178322 A1 Jun. 25, 2015

(51) Int. Cl.
*G06F 7/00* (2006.01)
*G06F 17/30* (2006.01)

(52) U.S. Cl.
CPC .............. *G06F 17/30268* (2013.01)

(58) Field of Classification Search
CPC .......... G06F 17/3087; G06F 2221/2111; G06F 17/30041; G06F 17/30047; G06F 17/30805; G06F 17/30268; G06F 17/30808
USPC ............. 707/727, 724, 729, 748, 999.003
See application file for complete search history.

(56) References Cited

U.S. PATENT DOCUMENTS

| 6,208,988 | B1 * | 3/2001 | Schultz | G06F 17/30616 |
| 7,502,770 | B2 | 3/2009 | Hillis et al. | |
| 7,702,681 | B2 | 4/2010 | Brewer et al. | |
| 8,312,010 | B1 * | 11/2012 | Chen | G06F 17/3087 707/723 |
| 8,379,913 | B1 | 2/2013 | Robinson et al. | |
| 8,463,772 | B1 | 6/2013 | Aminzade et al. | |
| 8,572,077 | B2 | 10/2013 | Dorfman et al. | |
| 8,666,112 | B1 * | 3/2014 | Jing | G01C 21/20 382/100 |
| 2006/0095540 | A1 * | 5/2006 | Anderson | H04N 1/00281 709/217 |
| 2007/0005571 | A1 * | 1/2007 | Brewer | G06F 17/30277 |
| 2007/0198495 | A1 * | 8/2007 | Buron | G06F 17/3087 |
| 2007/0203897 | A1 * | 8/2007 | Ueno | G06F 17/30244 |
| 2008/0033903 | A1 * | 2/2008 | Carol | G06F 17/3087 |
| 2010/0046842 | A1 * | 2/2010 | Conwell | G06F 17/30265 382/218 |
| 2010/0070523 | A1 * | 3/2010 | Delgo | G06F 17/3079 707/769 |

(Continued)

*Primary Examiner* — Mohammed R Uddin (74) *Attorney, Agent, or Firm* — Dority & Manning, P.A.

(57) ABSTRACT

Systems and methods for determining a geocode for an image based on user-provided search queries and corresponding user selections are provided. One example method includes determining a selection value for each of a plurality of search strings associated with an image based at least in part on user selection data. The method includes generating a textual document for the image based at least in part on the selection values. The textual document includes one or more of the plurality of search strings. The method includes identifying a plurality of geographic entities by analyzing the textual document using a textual processor. The method includes selecting one of the plurality of geographic entities as a primary geographic entity and associating, by the one or more computing devices, a geocode associated with the primary geographic entity with the image.

20 Claims, 7 Drawing Sheets (56) References Cited

U.S. PATENT DOCUMENTS

| | | | | |
|---|---|---|---|---|
| 2010/0082612 A1* | 4/2010 | Duan | G06F 17/30265 | 707/724 |
| 2010/0228469 A1* | 9/2010 | Varadarajan | G01C 21/32 | 701/532 |
| 2010/0310182 A1* | 12/2010 | Kroepfl | G06K 9/00624 | 382/216 |
| 2012/0294477 A1* | 11/2012 | Yang | G06F 17/30799 | 382/103 |
| 2012/0315884 A1* | 12/2012 | Forutanpour | H04W 4/026 | 455/414.2 |
| 2012/0323931 A1* | 12/2012 | Buchmueller | G06F 17/3087 | 707/749 |
| 2013/0036117 A1* | 2/2013 | Fisher | G06F 17/30041 | 707/736 |
| 2013/0159825 A1* | 6/2013 | Nishio | G06F 17/30241 | 715/205 |
| 2013/0298083 A1* | 11/2013 | Bertoldo | G06F 3/0482 | 715/835 |
| 2014/0297617 A1* | 10/2014 | Rajakarunanayake | G06F 17/30241 | 707/709 |
| 2014/0297669 A1* | 10/2014 | Rajakarunanayake | G06Q 30/00 | 707/756 |
| 2015/0142779 A1* | 5/2015 | Gupta | G06F 17/3028 | 707/722 |
| 2015/0149454 A1* | 5/2015 | Hieronymus | G06F 17/30268 | 707/728 |

* cited by examiner

CABLE CAR SAN FRANCISCO, CABLE CAR ALCATRAZ,
TROLLEY SAN FRANCISCO CALIFORNIA, SAN FRANCISCO HILLS

FIG. 4

1. /M/07S6BQG, CABLE CAR
2. /M/0D6LP, SAN FRANCISCO, LAT/LNG: 37.783333, −122.416667
3. /M/0H594, ALCATRAZ ISLAND, LAT/LNG: 37.82667, −122.423333
4. /M/07KFM, TRAM
5. /M/01N7Q, CALIFORNIA, LAT/LNG: 37.00, −120.00

*FIG. 5*

PRIMARY GEOGRAPHIC ENTITY AND GEOCODE:
/M/0D6LP, SAN FRANCISCO, LAT/LNG: 37.783333, −122.416667

AUXILIARY GEOGRAPHIC ENTITY AND GEOCODE:
/M/01N7Q, CALIFORNIA, LAT/LNG: 37.00, −120.00

GEOCODING OF IMAGES BASED ON SEARCH QUERIES

FIELD

The present disclosure relates generally to the geocoding of images. More particularly, the present disclosure relates to systems and methods for determining a geocode for an image based on user-provided search queries and corresponding user selections.

BACKGROUND

A large number of images exist at various locations accessible on the Internet. Some of these images have an associated geocode that indicates a particular location at which the image was captured or a particular location that the image depicts. For example, such locations may be indicated by a tag generated based on GPS data or may be locations generated or assigned by a user. Therefore, such images having geocodes can quickly and easily be organized or searched based on location. Thus, such images are more easily accessible for a person attempting to explore or visually learn about a particular location.

However, a significant percentage of the existing images do not have an associated geocode that identifies a particular location associated with the image. The absence of such location information makes it difficult to accurately organize such images based on location.

Certain existing systems for determining geocodes have inherent limitations. For example, matching images to a location based on a computerized analysis of the image content can require significant computing resources and, therefore, may be impractical for application to the entirety of the world's images. In addition, many images may not provide explicit location-specific visual content that is identifiable using existing algorithms.

As another example, determining a location for an image based solely on the textual content included in a web document that includes such image can lead to a significant number of images being miscategorized or not categorized at all. For example, analysis of a travel blog that includes imagery and text associated with a trip across multiple European countries may lead to certain of the images being geocoded to an incorrect location based on the surrounding text discussing a different portion of the trip.

Therefore, systems and methods that can accurately, quickly, and easily determine a geocode for an image are desirable.

SUMMARY

Aspects and advantages of the present disclosure will be set forth in part in the following description, or may be obvious from the description, or may be learned through practice of embodiments of the present disclosure.

One example aspect of the present disclosure is directed to a method for geocoding images. The method includes determining, by one or more computing devices, a selection value for each of a plurality of search strings associated with an image. The selection value for each search string is based at least in part on the number of instances in which the image was selected when the image was presented as a search result responsive to such search string. The method includes generating, by the one or more computing devices, a textual document for the image based at least in part on the selection values. The textual document includes one or more of the plurality of search strings. The method includes identifying, by the one or more computing devices, a plurality of geographic entities by analyzing the textual document using a textual processor. A plurality of geocodes are respectively associated with the plurality of geographic entities. The method includes selecting, by the one or more computing devices, one of the plurality of geographic entities as a primary geographic entity. The method includes associating, by the one or more computing devices, the geocode associated with the primary geographic entity with the image.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for geocoding an image based on user-provided search queries and corresponding user selections. In particular, a selection value can be determined for each of a plurality of search strings associated with an image. The selection value for each search string can correspond to the number of instances in which the image has been selected when the image was identified and presented as a search result in response to a query containing such search string. A textual document can be generated for the image based on the selection values. For example, the textual document can list the search strings having the largest selection values in order of decreasing value. The textual document can be analyzed using a textual processor to identify a plurality of geographic entities. In particular, the textual processor can return the geographic entities in order of decreasing confidence or relevance or otherwise indicate the relevance of the identified entities in some fashion, such as, for example, a confidence score. Each of the identified geographic entities can have an associated geocode, such as, for example, a latitude and a longitude. The geographic entity having the largest confidence can be selected as the primary geographic entity for the image and the geocode associated with such geographic entity can be associated with the image. Furthermore, one or more auxiliary geographic entities that encompass the primary geographic entity can be selected as well. In addition, in some embodiments, a precision value and a quality value can be determined for the image. In such fashion, a geocode for the image can quickly and easily be determined based on user-provided search queries and corresponding user selections.

The systems and methods of the present disclosure can leverage an existing image search system to identify appropriate geocodes for an image based on search queries and user choices. For example, a user can input or provide a search query to an image search system. The search query can include a textual search string (e.g. "cable car San Francisco"). In response to the search query, the image search system can identify a plurality of response images based on the textual search string and can provide the plurality of response images to the user as search results. The user can then click on or otherwise select one of the plurality of response images to receive additional information concerning the selected image, receive a full resolution copy of the selected image, be redirected to a webpage containing the selected image, or other similar responses.

According to an aspect of the present disclosure, the image search system can monitor or otherwise keep track of the number of instances in which a particular image is selected when provided as a search result for each of a plurality of particular search strings. For example, such number of instances for each particular search string can be referred to as a selection value. Thus, when the particular image is returned as a result for the search string "cable car San Francisco," and is then subsequently selected by a user, the selection value for the search string "cable car San Francisco" with respect to that particular image can be incremented. For example, selection of the image can be done by clicking on the image to zoom it in.

A textual document can be created for the image based on the selection values. For example, the textual document can be formatted in a fashion similar to textual content included in a webpage so as to leverage existing processing capabilities. In particular, the textual document can include a text string that is made up of one or more of the search strings associated with the image. As an example, the textual document can include a predetermined number of the search strings having the largest selection values for the image. As another example, the textual document can include all search strings having a selection value greater than a threshold value for the image. The search strings included in the textual document can be ordered according to their selection values, ranging from largest to smallest.

The textual document can be analyzed using a textual processor to identify a plurality of entities. As an example, the textual processor can analyze the textual document in light of a knowledge web providing machine-readable, complex structured information to identify the plurality of entities based on the textual document. One or more of the plurality of entities may be associated with a particular geographic location or region and, therefore, be considered geographic entities. The knowledge web can include information for each identified geographic entity, such as, for example, title, a geocode, geographic boundaries, encompassed geographic entities, or other information.

In some implementations, the text processor can return the plurality of identified entities in order of decreasing confidence or relevance. In other implementations, the text processor can provide a confidence score for each identified entity and the identified entities can be ordered into a sequence based on the confidence scores. In yet other implementations, the confidence score for each entity can be computed based on a confidence formula which takes into account the corresponding search string that resulted in identification of the entity, the relative position of such search string in the textual document, the selection value for such search string, and/or other factors.

The first geographic entity in the sequence (e.g. the geographic entity having the largest confidence score) can be selected as the primary geographic entity for the image. Thus, for example, the geographic entity that was most confidently identified by the textual processor based on the textual document can be selected as the primary geographic entity for the image.

A geocode associated with the primary geographic entity can be associated with the image. For example, the geocode can be a latitude and longitude associated with the primary geographic entity. The geocode can be annotated to the image, stored as metadata for the image, or other suitable associative procedures.

Therefore, the systems and methods of the present disclosure can quickly and easily assign a geocode to a particular image based on user search queries and corresponding selections. In addition, once a geocode has been determined for or assigned to an image, the image can then be identified as a response to a search query based at least in part on such geocode.

According to another aspect of the present disclosure, one or more of the remaining geographic entities can be selected as auxiliary geographic entities for the image. In particular, in some implementations, the remaining geographic entities can be considered iteratively in sequential order. For each remaining geographic entity it can be determined whether such geographic entity encompasses the most recently selected geographic entity. For example, the most recently selected geographic entity can be geographic entity selected as the primary geographic entity or a previous sequential geographic entity that has more recently been selected as an auxiliary entity.

If the geographic entity being considered does encompass the most recently selected geographic entity, then the geographic entity being considered can be selected as an auxiliary geographic entity for the image and, therefore, become the most recently selected geographic entity. Furthermore, a geocode associated with each selected auxiliary geographic entity can be associated with the image.

According to yet another aspect of the present disclosure, a precision value and a quality value can be determined for the image. As an example, the precision value for the image can be proportional to a geographic area covered by the primary geographic entity associated with the image. For example, the precision value can equal the geographic area raised to an exponent having a value between zero and one. Thus, a smaller precision value indicates that the geocode assigned to image corresponds more precisely to a given location associated with the image.

The quality value for a given image can be inherited from the primary geographic entity associated with such image. More particularly, in some implementations, each geographic entity can have a quality value that can then be attributed to all images for which such geographic entity is the primary geographic entity.

In particular, the above discussed systems and methods can be applied to a large corpus of images to determine a primary geographic entity and corresponding primary geocode for each image. Therefore, a geographic entity may have been selected as the primary geographic entity for a plurality of images.

In addition, adjunct location data may be associated with each of such plurality of images. For example, adjunct location data for an image can include EXIF tags indicating a location for the image (e.g. as determined by a GPS of the camera that captured such image), a location manually entered as a text tag by a user, or a location assigned to the user by dropping a pin on a map when uploading the image to an image sharing service.

The quality value associated with the geographic entity can be based on or equal to the percentage of the associated plurality of images for which the location indicated by the image's corresponding adjunct location data is encompassed by the geographic entity. Thus, the quality value for each geographic entity can be based on a percentage of associated image locations that are encompassed by such geographic entity.

Figure 1:
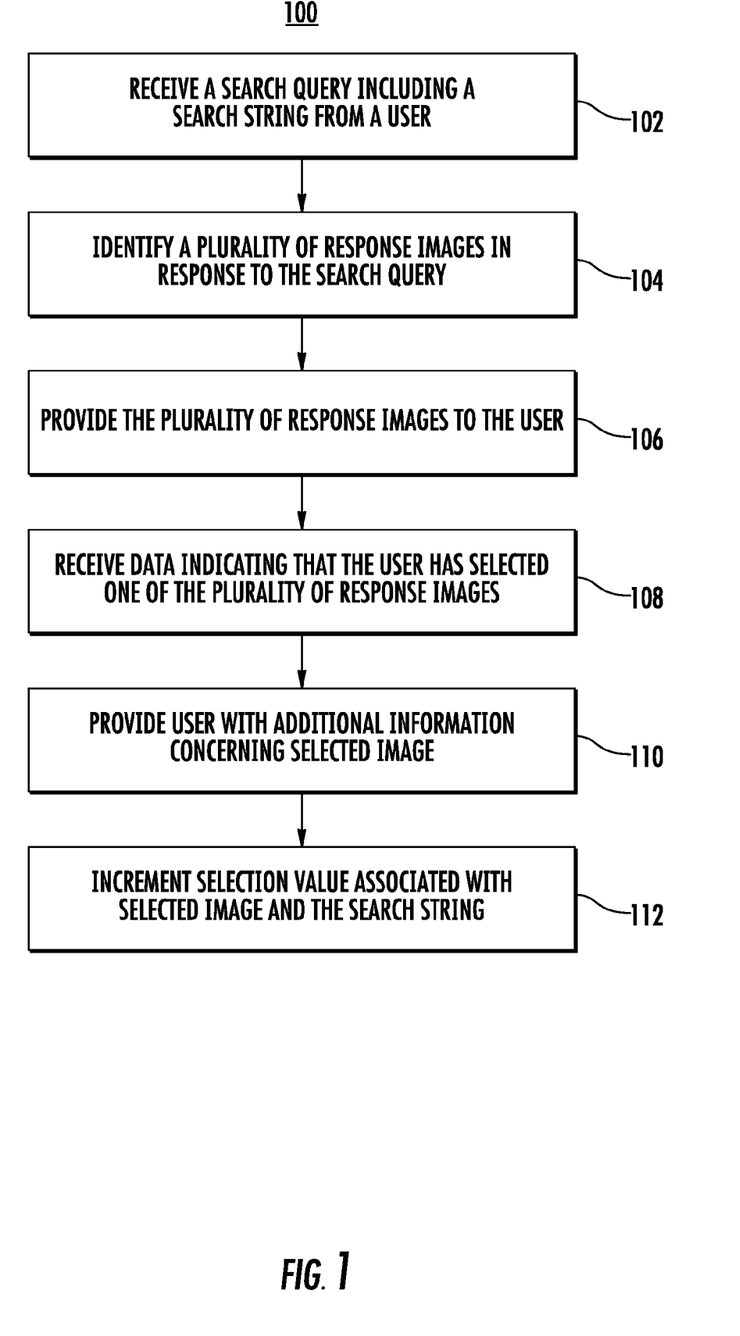
FIG. 1 depicts a flow chart of an example method for providing image search results according to an example embodiment of the present disclosure.

With reference now to the FIGS., example embodiments of the present disclosure will be discussed in further detail. FIG. 1 depicts a flow chart of an example method (100) for providing image search results according to an example embodiment of the present disclosure. Method (100) can be performed by any suitable computing system, including system 900 of FIG. 9.

In addition, FIG. 1 depicts steps performed in a particular order for purposes of illustration and discussion. Those of ordinary skill in the art, using the disclosures provided herein, will understand that the various steps of method (100) can be omitted, adapted, and/or rearranged in various ways without departing from the scope of the present disclosure.

At (102) a search query can be received from a user. The search query can include a search string. For example, a user can operate a user computing device such as, for example, a laptop, to provide a search query to an image search system. The search query can include a textual search string (e.g. "cable car San Francisco").

At (104) a plurality of response images can be identified in response to the search query. For example, the image search system can search a database of available images based on keyword, surrounding web content, metatags, or other existing search schemes At (106) the plurality of response images can be provided to the user. For example, the response images identified at (104) can be organized based on relevance or other formats and then returned to the user computing device for presentation to the user.

At (108) data can be received that indicates that the user has selected one of the plurality of response images. For example, the user can click on or otherwise select one of the plurality of response images to request additional information concerning the selected image. The user computing device can request such additional information from the search system, thereby providing the search system with an indication of which of the response images the user has selected.

At (110) additional information concerning the selected image can be provided to the user. In particular, the search system can provide the user computing device with a full resolution copy of the selected image, can redirect the user computing device to a webpage containing the selected image, or other similar responses. Thus, by selecting the image to receive additional information, the user has signaled that she believes the selected image to be particularly responsive to the search string received at (102).

At (112) a selection value associated with the image selected at (108) and the search string received at (102) can be incremented. Thus, for example, when a particular image is returned as a result for the search string "cable car San Francisco," and is then subsequently selected by a user, the selection value for the search string "cable car San Francisco" with respect to that particular image can be incremented. In such fashion, the selection value for each search string for each image can provide a crowd-sourced indication of how closely responsive such image is to each of such search strings.

Figure 2:
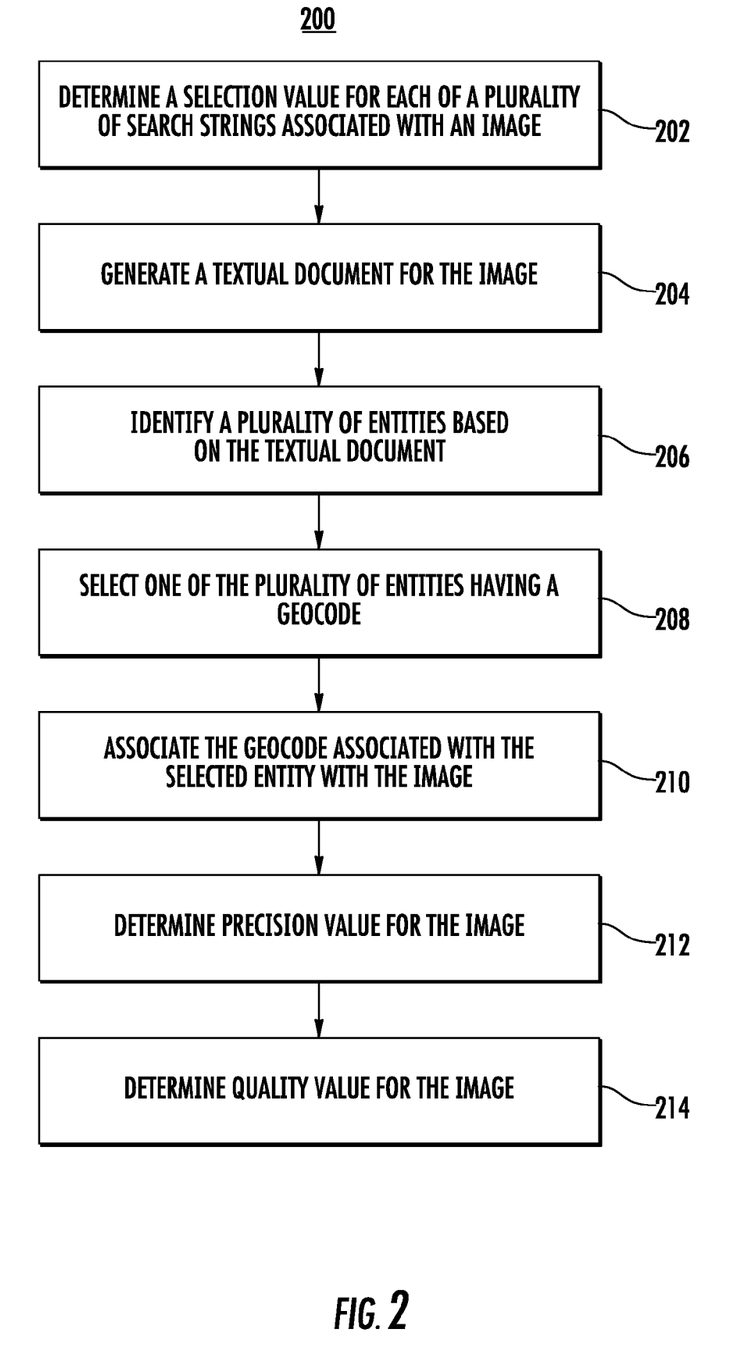
FIG. 2 depicts a flow chart of an example method for geocoding an image according to an example embodiment of the present disclosure.

FIG. 2 depicts a flow chart of an example method (200) for geocoding an image according to an example embodiment of the present disclosure. Method (200) can be performed by any suitable computing system, including system 900 of FIG. 9.

In addition, FIG. 2 depicts steps performed in a particular order for purposes of illustration and discussion. Those of ordinary skill in the art, using the disclosures provided herein, will understand that the various steps of method (200) can be omitted, adapted, and/or rearranged in various ways without departing from the scope of the present disclosure.

At (202) a selection value can be determined for each of a plurality of search strings associated with an image. In particular, according to an aspect of the present disclosure, an image search system can monitor or otherwise keep track of the number of instances in which a particular image is selected when provided as a search result for each of a plurality of particular search strings. For example, method (100) of FIG. 1 can be repeated for a significant number search queries to build selection values for a number of search strings for each of a plurality of images.

Figure 3:
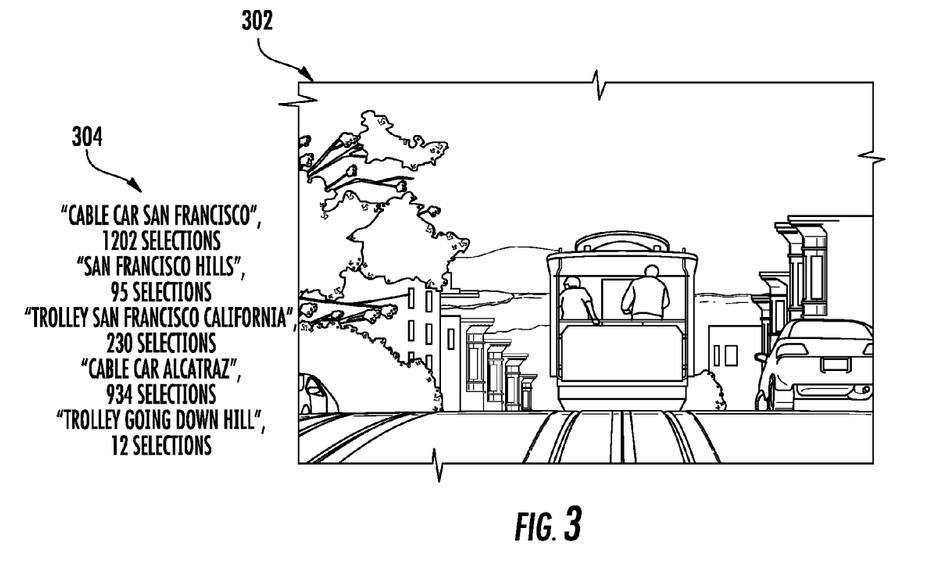
FIG. 3 depicts an example image and example search strings according to an example embodiment of the present disclosure.

As an example, FIG. 3 depicts an example image 302 and example search strings 304 according to an example embodiment of the present disclosure. In particular, image 302 may not have an associated geocode that identifies a particular location associated with image 302. However, image 302 may have metatags or surrounding web content that result in image 302 being provided as a response image in response to user-provided search queries.

For example, as shown by search strings 304, image 302 has been returned as a search result and then selected a significant number of times. In particular, image 302 has been returned as a search result and then selected with respect to the search string "cable car san Francisco" 1202 times. Likewise, image 302 has been returned as a search result and then selected with respect to the search string "san francisco hills" 95 times.

Additional search strings 304 and their corresponding selection values are shown by FIG. 3 as well. In addition, although FIG. 3 depicts selection values that are equal to the number of instances in which the image has been returned as a search result and selected with respect to a particular search string, a selection value does not necessarily directly equal such number of instances. For example, in some implementations of the present disclosure, a conversion formula can be used to determine each selection value based at least in part on the corresponding number of instances of user-selection.

Returning to FIG. 2, at (204) a textual document can be generated for the image. For example, the textual document can be formatted in a fashion similar to textual content included in a webpage so as to leverage existing processing capabilities. In particular, the textual document can include a text string that is made up of one or more of the search strings associated with the image.

As an example, the textual document can include a predetermined number of the search strings having the largest selection values for the image. As another example, the textual document can include all search strings having a selection value greater than a threshold value for the image. The search strings included in the textual document can be ordered according to their selection values, ranging from largest to smallest.

Figure 4:
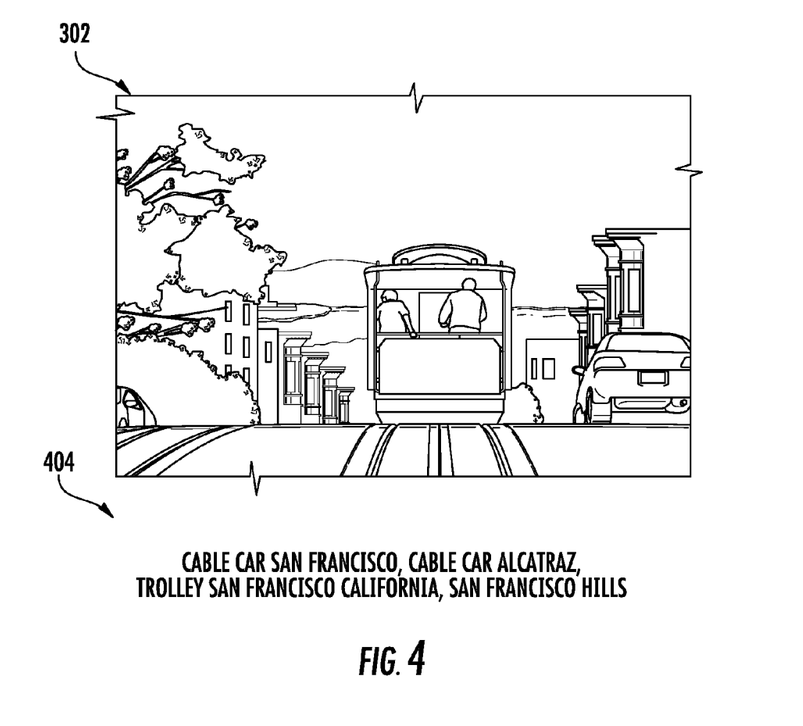
FIG. 4 depicts an example textual document according to an example embodiment of the present disclosure.

As an example, FIG. 4 depicts an example textual document 404 according to an example embodiment of the present disclosure. In particular, textual document 404 includes the four search strings 304 of FIG. 3 that have the largest selection values. The search string having the largest selection value is ordered first, followed by the search string having the second largest selection value, and so forth.

Returning to FIG. 2, at (206) a plurality of entities can be identified based on the textual document generated at (204). As an example, the textual document generated at (204) can be analyzed using a textual processor to identify a plurality of entities.

As an example, the textual processor can analyze the textual document in light of a knowledge web providing machine-readable, complex structured information to identify the plurality of entities based on the textual document. However, the textual processor can employ various other resources as well, including text searchable databases, wikis, or other forms of data.

One or more of the plurality of entities may be associated with a particular geographic location or region and, therefore, be considered geographic entities. For example, in some implementations of the present disclosure, any entity that resides at or encompasses a particular location can be designated or considered as a geographic entity.

As an example, the knowledge web or other data structure can include information for each identified geographic entity, such as, for example, title, a geocode, geographic boundaries, encompassed geographic entities, or other information.

In some implementations, at (206) the text processor can return the plurality of identified entities in order of decreasing confidence or relevance. In other implementations, the text processor can provide a confidence score for each identified entity and the identified entities can be ordered into a sequence based on the confidence scores at (206).

In yet other implementations, a confidence score for each entity can be computed at (206) based on a confidence formula which takes into account the corresponding search string that resulted in identification of the entity, the relative position of such search string in the textual document, the selection value for such search string, and/or other factors.

Figure 5:
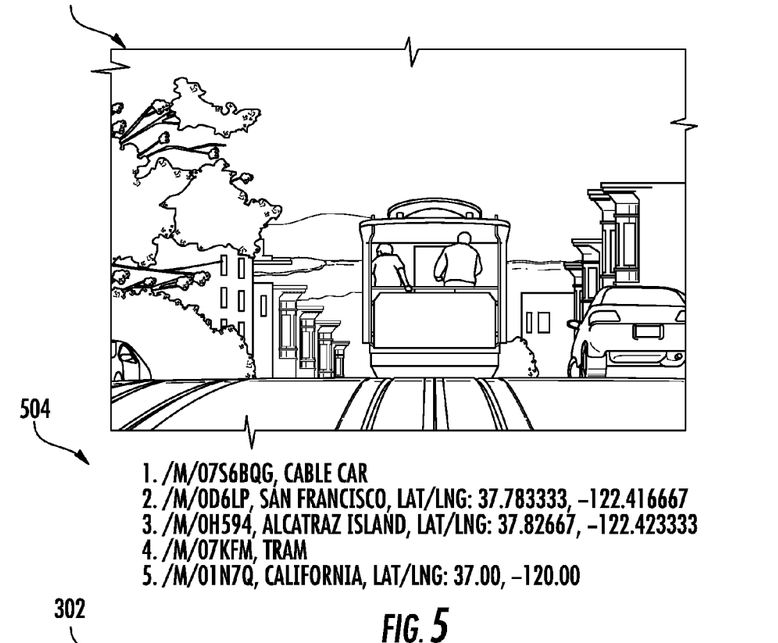
FIG. 5 depicts a list of example entities according to an example embodiment of the present disclosure.

As an example, FIG. 5 depicts a list 504 of example entities according to an example embodiment of the present disclosure. In particular, list 504 includes five entities that have been identified by a textual processor based at least in part on the textual document 404 of FIG. 4. The entities are listed in order of confidence or relevance. Each entity is identified by a title and also by a code that identifies it in the context of the knowledge web.

Entities two, three, and five are geographic entities because they are associated with a particular location. For example, such geographic entities can have an associated geocode, such as, for example, the latitudes and longitudes respectively provided by list 504.

However, a geocode is not required to be a latitude and longitude. A geocode can be any suitable form of data that identifies a particular location. For example, a geocode may include coordinates, geographic boundaries, elevation, and/or other data or codes that identify locations.

Returning to FIG. 2, at (208) one of the plurality of entities having a geocode can be selected. As an example, the first geographic entity in the sequence (e.g. the geographic entity that was most confidently identified by the textual processor based on the textual document) can be selected as the primary geographic entity for the image. As another example, the geographic entity having the largest confidence score can be selected as the primary geographic entity for the image. Thus, entity two, San Francisco, can be selected as the primary geographic entity for the image as it is the first listed geographic entity.

At (210) the geocode associated with the entity selected at (208) can be associated with the image. For example, the geocode can be a latitude and longitude associated with the primary geographic entity selected at (208). The geocode can be annotated to the image, stored as metadata for the image, or other suitable associative procedures.

According to another aspect of the present disclosure, one or more of the remaining geographic entities can be selected as auxiliary geographic entities for the image. In particular, in some implementations, the remaining geographic entities can be considered iteratively in sequential order.

In particular, as an example, for each remaining geographic entity it can be determined whether such geographic entity encompasses the most recently selected geographic entity. For example, the most recently selected geographic entity can be geographic entity selected as the primary geographic entity or a previous sequential geographic entity that has more recently been selected as an auxiliary entity.

Figure 7:
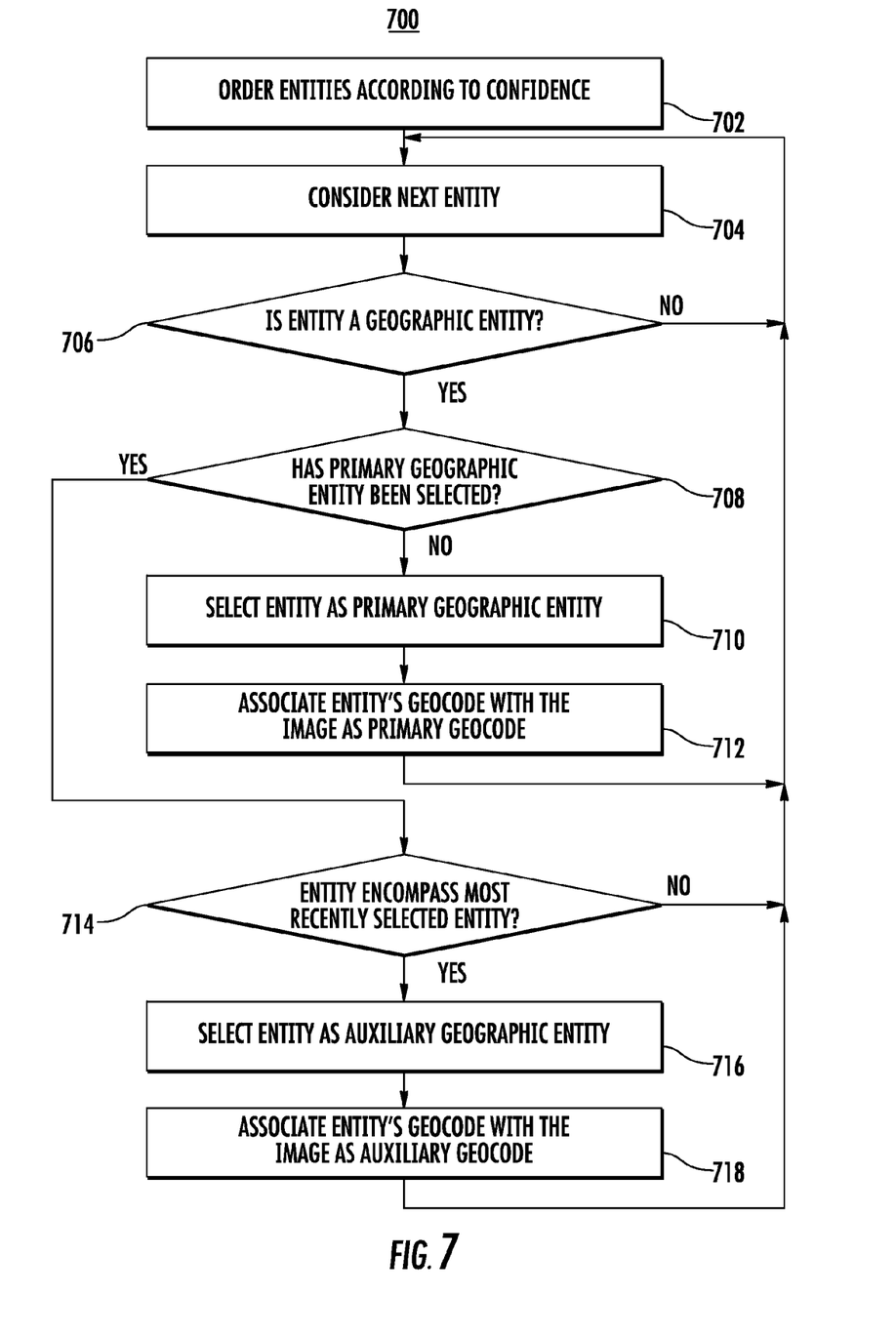
FIG. 7 depicts a flow chart of an example method for geocoding an image according to an example embodiment of the present disclosure.

As an example, FIG. 7 depicts a flow chart of an example method for geocoding an image according to an example embodiment of the present disclosure. Method (700) can be performed by any suitable computing system, including system 900 of FIG. 9.

In addition, FIG. 7 depicts steps performed in a particular order for purposes of illustration and discussion. Those of ordinary skill in the art, using the disclosures provided herein, will understand that the various steps of method (700) can be omitted, adapted, and/or rearranged in various ways without departing from the scope of the present disclosure.

At (702) a plurality of entities can be ordered according to confidence into a sequence. For example, in some implementations, a text processor can identify a plurality of entities based on a textual document and can return the plurality of entities in order of decreasing confidence or relevance. In other implementations, the text processor can provide a confidence score for each identified entity and the identified entities can be ordered into a sequence based on the confidence scores.

In yet other implementations, the confidence score for each entity can be computed based on a confidence formula which takes into account the corresponding search string that resulted in identification of the entity, the relative position of such search string in the textual document, the selection value for such search string, and/or other factors.

At (704) the next entity can be obtained or otherwise considered. More particularly, method (700) can be implemented in an iterative fashion such that each of a plurality of entities is considered sequentially on an individual basis. Thus, at the first instance of (704), the first entity in the sequence can be considered.

At (706) it can be determined whether the considered entity is a geographic entity. For example, in some implementations of the present disclosure, any entity that resides at or encompasses a particular location can be designated or considered as a geographic entity.

If it is determined at (706) that the considered entity is not a geographic entity, then method (700) can return to (704) and consider the next entity in the sequence.

However, if it is determined at (706) that the considered entity is a geographic entity, then method (700) can proceed to (708).

At (708) it can be determined whether a primary geographic entity has previously been selected for the image. For example, according to an aspect of the present disclosure, a geographic entity can be selected as a primary geographic entity for the image. Once the primary geographic entity has been selected, one or more auxiliary geographic entities can be selected for the image.

Thus, if it is determined at (708) that a primary geographic entity has not been previously selected, then method (700) can proceed to (710).

At (710) the considered entity can be selected as the primary geographic entity for the image. Thus, the first sequential geographic entity can be selected as the primary geographic entity for the image.

At (712) the geocode of the considered entity can be associated with the image as the primary geocode for the image. For example, the geocode can be annotated to the image, stored as metadata for the image, or other suitable associative procedures. After (712), method (700) can return to (704) and obtain or otherwise consider the next entity.

However, returning to (708), if it is determined at (708) that a primary geographic entity has been previously selected for the image, then method (700) can proceed to (714).

At (714) it can be determined whether the considered entity encompasses the most recently selected entity. As an example, one or more geographic boundaries can be determined for the considered entity at (714) and it can be determined whether the most recently selected entity is encompassed within such boundaries.

As another example, in some implementations, the knowledge web or other data structure consulted by the textual processor can include data indicating whether a particular geographic entity encompasses or is encompassed by other particular geographic entities. Thus, such data structure can be consulted at (714) to determine whether the considered entity encompasses the most recently selected entity.

If it is determined at (714) that the considered entity does not encompass the most recently selected entity, then method (700) can return to (704) and obtain or otherwise consider the next entity. However, if it is determined at (714) that the considered entity does encompass the most recently selected entity, then method (700) can proceed to (716).

At (716) the considered entity can be selected as an auxiliary geographic entity for the image. Thus, if the geographic entity being considered does encompass the most recently selected geographic entity, then the geographic entity being considered can be selected as an auxiliary geographic entity for the image and, therefore, become the most recently selected geographic entity.

At (718) the geocode of the considered entity can be associated with the image as an auxiliary geocode for the image. For example, the geocode can be annotated to the image, stored as metadata for the image, or other suitable associative procedures. After (718), method (700) can return to (704) and obtain or otherwise consider the next entity.

Figure 6:
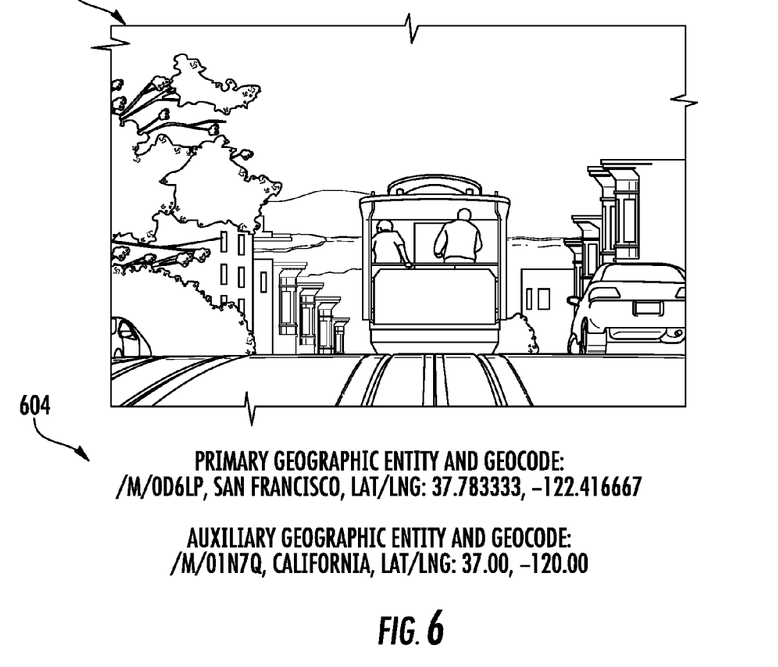
FIG. 6 depicts an example image and example primary and auxiliary geographic entities according to an example embodiment of the present disclosure.

As another example, FIG. 6 depicts an example image 302 and example primary and auxiliary geographic entities 604 according to an example embodiment of the present disclosure. As depicted in FIG. 6, the entity San Francisco has been selected as the primary geographic entity for image 302.

In particular, example primary and auxiliary geographic entities 604 can have been selected by applying method (700) to the list 504 of entities from FIG. 5. For example, the list 504 of entities has been ordered according to confidence.

The first entity, Cable Car, is discarded or otherwise passed upon because it is not a geographic entity. The second entity, San Francisco, is then selected as the primary geographic entity. Thus, as shown in FIG. 6, San Francisco is selected as the primary geographic entity for image 302 and the associated geocode can be associated with image 302 as the primary geocode.

The third entity, Alcatraz Island, is not selected as an auxiliary entity because it does not encompass the most recently selected entity, San Francisco. The fourth entity, Tram, is discarded or otherwise passed upon because it is not a geographic entity.

The fifth entity, California, is selected as an auxiliary geographic entity because it encompasses the most recently selected entity, San Francisco. Thus, as shown in FIG. 6, California is selected as an auxiliary geographic entity for image 302 and the associated geocode can be associated with image 302 as an auxiliary geocode. If additional entities were included in list 504, California would be used as the most recently selected entity until another auxiliary entity was selected.

Returning again to FIG. 2, at (212) a precision value can be determined for the image. As an example, the precision value for the image can be proportional to a geographic area covered by the primary geographic entity associated with the image. For example, the precision value can equal the geographic area covered by the primary geographic entity raised to an exponent having a value between zero and one.

Thus, a smaller precision value indicates that the geocode assigned to image corresponds more precisely to a given location associated with the image. Furthermore, it will be appreciated that a precision value can also optionally be determined for each auxiliary geographic entity associated with an image in the same fashion (e.g. based on the respective geographic area covered by each auxiliary geographic entity).

At (214) a quality value can be determined for the image. The quality value for a given image can be inherited from the primary geographic entity associated with such image. More particularly, in some implementations, each geographic entity can have a quality value that can then be attributed to all images for which such geographic entity is the primary geographic entity.

Figure 8:
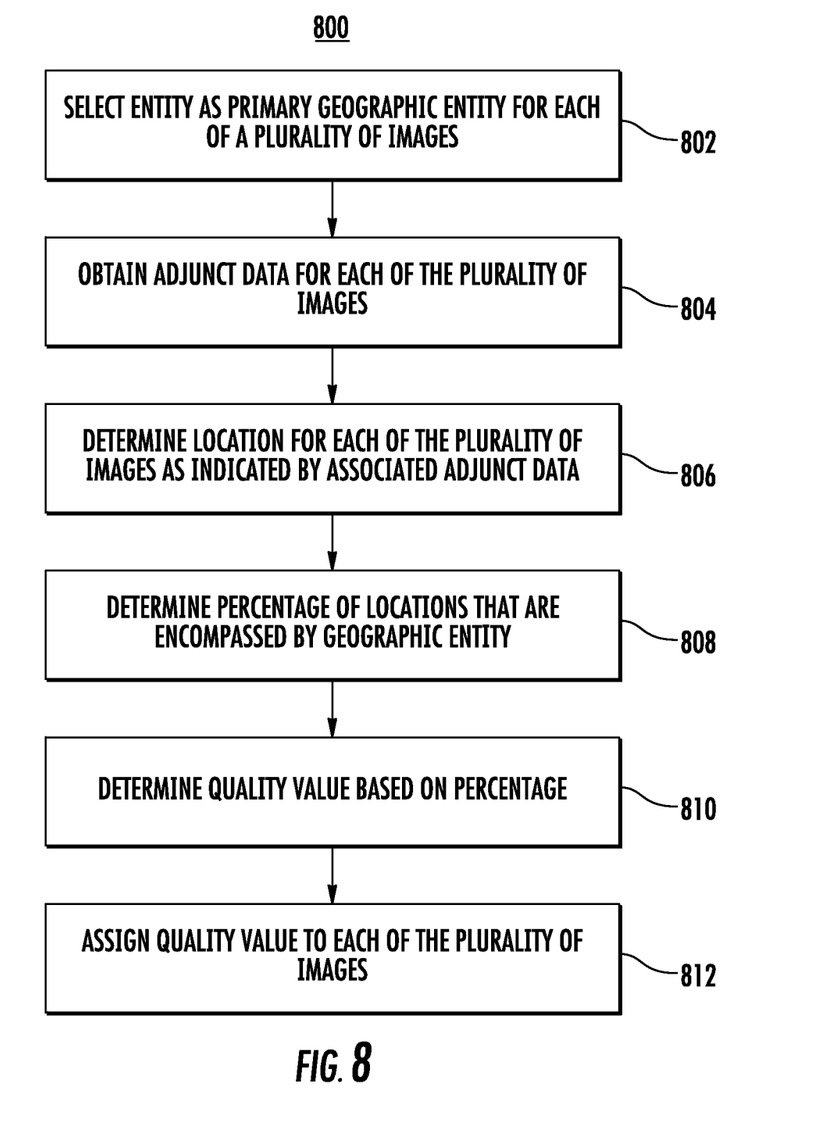
FIG. 8 depicts a flow chart of an example method for determining a quality value according to an example embodiment of the present disclosure.

As an example, FIG. 8 depicts a flow chart of an example method for determining a quality value according to an example embodiment of the present disclosure. Method (800) can be performed by any suitable computing system, including system 900 of FIG. 9.

In addition, FIG. 8 depicts steps performed in a particular order for purposes of illustration and discussion. Those of ordinary skill in the art, using the disclosures provided herein, will understand that the various steps of method (100) can be omitted, adapted, and/or rearranged in various ways without departing from the scope of the present disclosure.

At (802) an entity can be selected as the primary geographic entity for each of a plurality of images. In particular, the methods discussed above can be applied to a large corpus of images to determine a primary geographic entity and corresponding primary geocode for each image. Therefore, a particular geographic entity may have been selected as the primary geographic entity for a plurality of images.

At (804) adjunct location data can be obtained for each of the plurality of images. At (806) a location can be determined for each of the plurality of images as indicated by the associated adjunct location data.

As an example, adjunct location data for an image can include EXIF tags indicating a location for the image (e.g. as determined by a GPS of the camera that captured such image), a location manually entered as a text tag by a user, or a location assigned to the user by dropping a pin on a map when uploading the image to an image sharing service. Thus, a location can be identified for each image based on such adjunct location data.

At (808) a percentage of the locations determined at (806) that are encompassed by the entity can be determined. For example, each of the locations can be compared to the geographic boundaries associated with the entity to determine the percentage of such locations that are encompassed by the entity.

At (810) a quality value can be determined based on the percentage determined at (808). For example, the quality value associated with the geographic entity can equal the percentage of locations that are encompassed by the geographic entity. As another example, a quality formula can be used to determine the quality value based at least in part on the percentage determined at (808).

At (812) the quality value determined at (810) can be assigned to each of the plurality of images. Thus, the quality value for each image can be inherited from its primary geographic entity. Furthermore, it will be appreciated that a quality value can be computed for each auxiliary geographic entity associated with an image in the same fashion.

Figure 9:
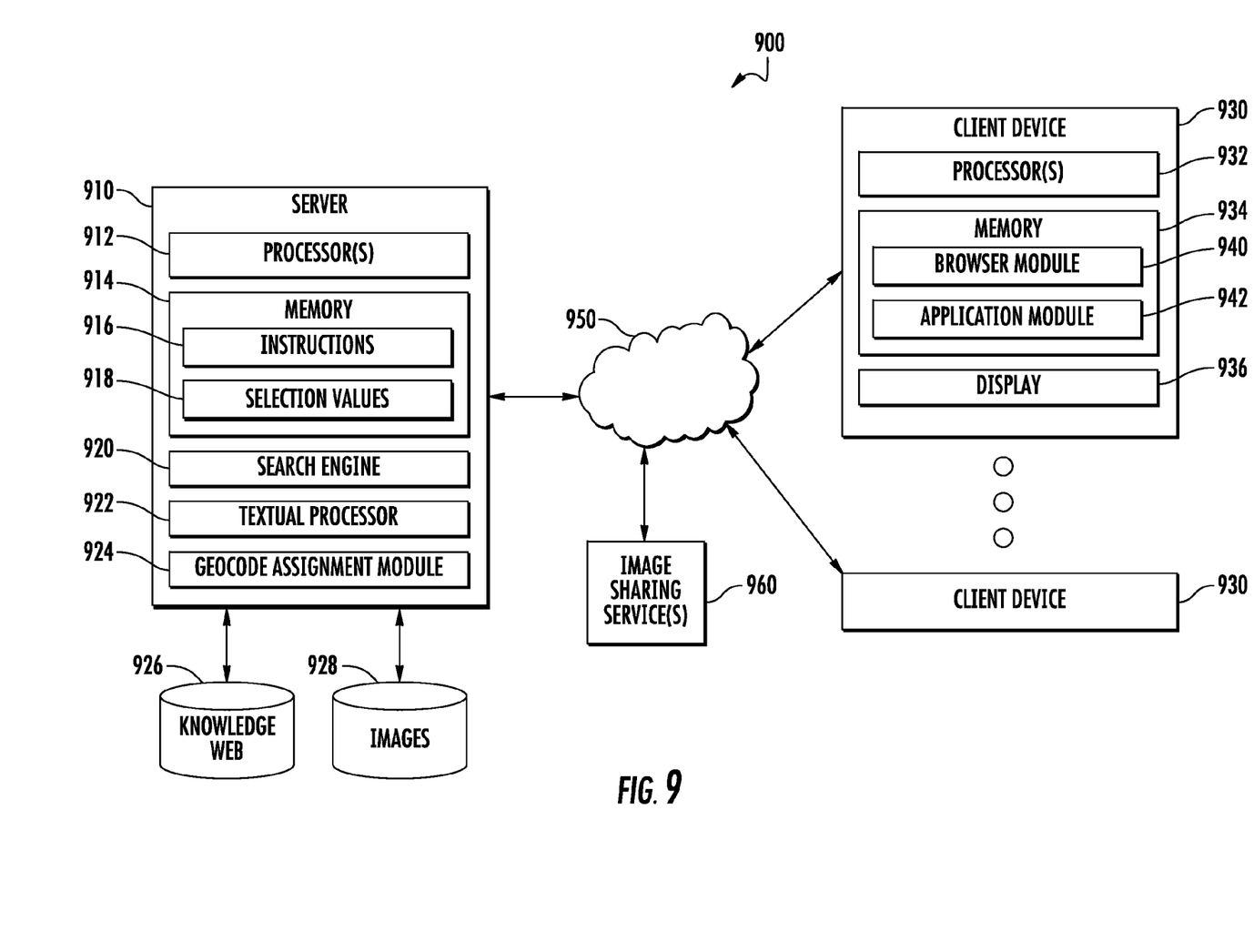
FIG. 9 depicts an example system for geocoding an image according to an example embodiment of the present disclosure.

FIG. 9 depicts an example system 900 for geocoding an image according to an example embodiment of the present disclosure. The system 900 is a client-server architecture that includes a server 910 that communicates with one or more client devices 930 over a network 950.

The system 900 includes a server 910, such as a web server. Server 910 can be implemented using one or more computing devices. When server 910 is implemented using a plurality of computing devices, such computing devices can be organized into a distributed computing system or a parallel computing system.

The server 910 can have one or more processor(s) 912 and a memory 914. The server 910 can also include a network interface used to communicate with one or more remote computing devices (e.g. client devices) 930 over a network 950.

The processor(s) 912 can be any suitable processing device, such as a microprocessor, microcontroller, integrated circuit, or other suitable processing device. The memory 914 can include any suitable computing system or media, including, but not limited to, non-transitory computer-readable media, RAM, ROM, hard drives, flash drives, or other memory devices. The memory 914 can store information accessible by processor(s) 912, including instructions 916 that can be executed by processor(s) 912. The instructions 916 can be any set of instructions that when executed by the processor(s) 912, cause the processor(s) 912 to provide desired functionality.

Memory 914 can also include data 918, such as selection values, that can be retrieved, manipulated, created, or stored by processor(s) 912. The data 918 can be stored in one or more databases. The one or more databases can be connected to the server 910 by a high bandwidth LAN or WAN, or can also be connected to server 910 through network 950. The one or more databases can be split up so that they are located in multiple locales.

Server 910 can further include a search engine 920, a textual processor 922, and a geocode assignment module 924. It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Search engine 920 can be any components or functionality for searching for available data based on a search query. For example, search engine 920 can be a component of an image search system that identifies a plurality of response images in response to a search query received from a user.

Textual processor 922 can be any components or functionality for deriving semantic entities from a textual document. For example, textual processor 922 can analyze a textual document or text string in view of a knowledge web providing entity data to identify a plurality of entities.

Server 910 can implement geocode assignment module 924 to determine and assign a geocode to a plurality of images. For example, geocode assignment module 924 can be implemented to perform aspects of methods (200), (700), and/or (800).

The server 910 can include or be in communication with a knowledge web database 926 and an image database 928. Databases 926 and 928 can be connected to the server 910 by a high bandwidth LAN or WAN, or can also be connected to server 910 through network 950. The one or more databases can be split up so that they are located in multiple locales.

Knowledge web 926 can provide machine-readable, complex structured information concerning a plurality of entities. One or more of the plurality of entities may be associated with a particular geographic location or region and, therefore, be considered geographic entities. The knowledge web 926 can include information for each geographic entity, such as, for example, title, a geocode, geographic boundaries, encompassed geographic entities, or other information.

Image database 928 can include a plurality of images. The images may or may not have an associated geocode. Thus, in some implementations, server 910 can implement geocode assignment module 924 to assign a geocode to each image in database 928.

The server 910 can exchange data with one or more image sharing services 960. For example, image sharing services 960 can be any website or database for hosting, posting, or sharing images such as, for example, photographs. In some implementations, image sharing services 960 can allow users to annotate images with textual metatags and/or indicate a location for an image by selecting a location on a map (e.g. dropping a pin).

In some implementations, image sharing service(s) 960 can be internal to or included in server 910. In other implementations, server 910 can aggregate adjunct location data from multiple third-party image sharing services 960.

The server 910 can also exchange data with one or more client devices 930 over the network 950. Although two client devices 930 are illustrated in FIG. 9, any number of client devices 930 can be connected to the server 910 over the network 950. The client devices 930 can be any suitable type of computing device, such as a general purpose computer, special purpose computer, laptop, desktop, integrated circuit, mobile device, smartphone, tablet, wearable computing device, or other suitable computing device.

Similar to server 910, a client device 930 can include a processor(s) 932 and a memory 934. The memory 934 can store information accessible by processor(s) 932, including instructions that can be executed by processor(s) and data. As an example, memory 934 can store a browser module 940 and an application module 942.

Browser module 940 can provide instructions for implementing a browser. In particular, the user of client device 930 can exchange data with server 910 by using the browser to visit a website accessible at a particular web-address. The user interfaces of the present disclosure can be provided as an interface of the website.

Application module 942 can provide instructions for running a specialized application on client device 930. In particular, the specialized application can be used to exchange data with server 910 over the network 950.

The client device 930 can include various input/output devices for providing and receiving information from a user, such as, for example, a touch screen, touch pad, data entry keys, speakers, mouse, and/or a microphone suitable for voice recognition. For instance, the client device 930 can have a display 936 for presenting information, such as a plurality of images in response to a search query.

In some embodiments in which the systems and method discussed herein utilize information about users (e.g. determining selection values for given search strings based on user selections of response images), the users may be provided with an opportunity to control whether programs or features collect or utilize such information. In addition, in various embodiments, certain information or data can be treated in or more ways before it is stored or used, so that personally identifiable information is removed.

The network 950 can be any type of communications network, such as a local area network (e.g. intranet), wide area network (e.g. Internet), or some combination thereof. The network 950 can also include a direct connection between client device 930 and the server 910. In general, communication between the server 910 and a client device 930 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for geocoding images, the method comprising:
    determining, by one or more computing devices, a selection value for each of a plurality of search strings associated with an image, wherein the selection value for each search string is based at least in part on the number of instances in which the image was selected when the image was presented as a search result responsive to such search string;
    generating, by the one or more computing devices, a textual document for the image based at least in part on the selection values, wherein the textual document includes one or more of the plurality of search strings, wherein the textual document for the image comprises a predetermined number of the plurality of search strings having the selection values of greatest magnitude, and wherein the predetermined number of the plurality of search strings are ordered according to their corresponding selection values;
    identifying, by the one or more computing devices, a plurality of geographic entities by analyzing the textual document using a textual processor, wherein a plurality of geocodes are respectively associated with the plurality of geographic entities;
    selecting, by the one or more computing devices, one of the plurality of geographic entities as a primary geographic entity; and
    associating, by the one or more computing devices, the geocode associated with the primary geographic entity with the image.

2. The method of claim 1, further comprising:
    receiving, by the one or more computing devices, a search query;
    identifying, by the one or more computing devices, the image as responsive to the search query based at least in part on the geocode associated with the image; and
    providing, by the one or more computing device, the image as a search result for the search query.

3. The method of claim 1, further comprising, prior to determining the selection value for each of the plurality of search strings:
receiving, by the one or more computing devices, an image search query from a user, wherein the image search query includes one of the plurality of search strings;
identifying, by the one or more computing devices, a plurality of response images in response to the image search query, wherein the image is included in the plurality of response images;
receiving, by the one or more computing devices, data indicating that the user has selected the image from the plurality of response images; and
in response to receiving the data indicating that the user has selected the image from the plurality of response images, incrementing, by the one or more computing devices, the selection value associated with the search string included in the image search query.

4. The method of claim 1, wherein:
the textual processor provides a relevance score for each of the plurality of geographic entities; and
selecting, by the one or more computing devices, one of the plurality of plurality of geographic entities comprises selecting, by the one or more computing devices, the geographic entity having the relevance score of greatest magnitude.

5. The method of claim 1, further comprising ordering, by the one or more computing devices, the plurality of geographic entities into a sequence based on confidence; and wherein selecting, by the one or more computing devices, one of the plurality of plurality of geographic entities comprises selecting, by the one or more computing devices, the first sequential geographic entity.

6. The method of claim 5, further comprising, after selecting, by the one or more computing devices, the first sequential geographic entity:
determining, by the one or more computing devices for each sequential geographic entity, whether such geographic entity encompasses the most recently selected geographic entity; and
when it is determined that a geographic entity encompasses the most recently selected geographic entity, selecting, by the one or more computing devices, such geographic entity as an auxiliary geographic entity for the image.

7. The method of claim 1, further comprising selecting, by the one or more computing devices, one or more auxiliary geographic entities from the plurality of geographic entities, wherein the one or more auxiliary geographic entities respectively encompass the primary geographic entity.

8. The method of claim 1, further comprising determining, by the one or more computing devices, a precision value for the image based at least in part on a geographic area covered by the primary geographic entity.

9. The method of claim 1, further comprising determining, by the one or more computing devices, a quality value for the primary geographic entity by performing operations, the operations comprising:
identifying, by the one or more computing devices for each of the plurality of geographic entities, a plurality of other images for which the primary geographic entity has been selected;
obtaining, by the one or more computing devices, adjunct location data for each of the plurality of other images, wherein the adjunct location data specifies a location;
determining, by the one or more computing devices for each of the plurality of other images, the quality value for the primary geographic entity based at least in part on the percentage of the locations specified by the adjunct location data that are encompassed by the primary geographic entity.

10. A computing system comprising one or more processors and one or more non-transitory computer-readable media storing instructions that, when executed by the one or more processors, cause the computing system to perform operations, the operations comprising:
determining, for each of a plurality of images, a number of user selections associated with each of a plurality of search strings;
generating, for each of the plurality of images, a textual document that lists one or more of the plurality of search strings, wherein the one or more listed search strings are ordered according to their respective numbers of user selections, wherein a predetermined number of the plurality of search strings are ordered according to their corresponding selection values;
identifying, for each of the plurality of images, a plurality of entities based at least in part on the textual document associated with such image, wherein the plurality of entities for each image are ordered into a sequence according to a confidence metric, and wherein one or more of the plurality of entities identified based on each textual document comprise geographic entities respectively having associated geocodes; and
selecting, for each of the plurality of images, the geocode of the first sequential geographic entity as the primary geocode for such image.

11. The computing system of claim 10, wherein the number of user selections for each of the plurality of search strings for each of the plurality of images comprises the number of instances in which such image was returned as a search result in response to such search string and then selected.

12. The computing system of claim 10, wherein identifying, for each of the plurality of images, a plurality of entities based at least in part on the textual document associated with such image comprises analyzing, for each of the plurality of images, the textual document associated with such image using a textual processor.

13. The computing system of claim 12, wherein the confidence metric for the plurality of entities identified for each document comprises a plurality of relevance values assigned to the plurality of entities by the textual processor.

14. The computing system of claim 10, wherein the operations further comprise:
determining, for each of the plurality of images, a precision value based at least in part on a geographic area associated with the first sequential geographic entity for such image; and
determining, for each geographic entity, a quality value based at least in part on a percentage of associated image locations that are encompassed by such geographic entity.

15. One or more non-transitory computer-readable media storing instructions that, when executed by one or more computing devices, cause the one or more computing devices to perform operations, the operations comprising:
generating a text string for an image, wherein the text string comprises a plurality of search strings for which the image was returned as a search result and selected the greatest number of times, wherein the generating the text string comprises generating a textual document for the image based at least in part on the number of times the image was selected, wherein the textual document includes one or more of the plurality of search strings having the selection values of greatest magnitude, and wherein a predetermined number of the plurality of search strings are ordered according to their corresponding selection values;

processing the text string for the image to identify a plurality of geographic entities, wherein a plurality of confidence scores are respectively associated with the plurality of geographic entities; and associating with the image a geocode associated with the geographic entity having the largest confidence score.

16. The one or more non-transitory computer-readable media of claim 15, wherein:

associating the geocode associated with the geographic entity having the largest confidence score with the image comprises selecting the geocode associated with the geographic entity having the largest confidence score as the primary geocode for the image; and the operations further comprise iteratively considering the plurality of geographic entities in order of confidence scores to select one or more auxiliary geocodes.

17. The one or more non-transitory computer-readable media of claim 16, wherein iteratively considering the plurality of geographic entities in order of confidence scores to select one or more auxiliary geocodes comprises performing a plurality of iterations, each iteration comprising:

obtaining the geographic entity having the next largest confidence score;

determining whether the geographic entity associated with the most recently selected geocode is encompassed within the obtained geographic entity;

when it is determined that the geographic entity associated with the most recently selected geocode is encompassed within the obtained geographic entity, selecting the geocode associated with the obtained geographic entity as an auxiliary geocode.

18. The one or more non-transitory computer-readable media of claim 15, wherein:

the text string comprises the plurality of search strings in an order of decreasing number of user selections; and the confidence score associated with each of the plurality of geographic entities is based at least in part on the order of the search strings.

19. The one or more non-transitory computer-readable media of claim 15, wherein:

the search strings included in the textual document have a selection value greater than a threshold value for the image, wherein the selection value for each search string is based at least in part on the number of times the image was selected.

20. The one or more non-transitory computer-readable media of claim 19, wherein:

the selection value for each search string provides a crowd-sourced indication of how closely responsive the image is to each of the search strings.

* * * * *